INVENTOR.
JOHN DOLZA

INVENTOR.
JOHN DOLZA
BY
*Everett G. Wright*
ATTORNEY

July 31, 1962 — J. DOLZA — 3,046,961
INTERNAL COMBUSTION ENGINES
Filed Sept. 26, 1960 — 3 Sheets-Sheet 3
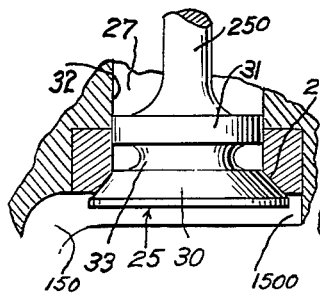
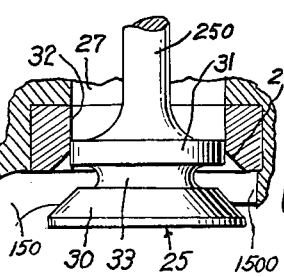
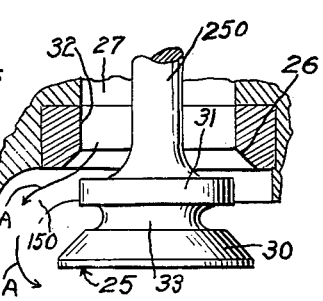
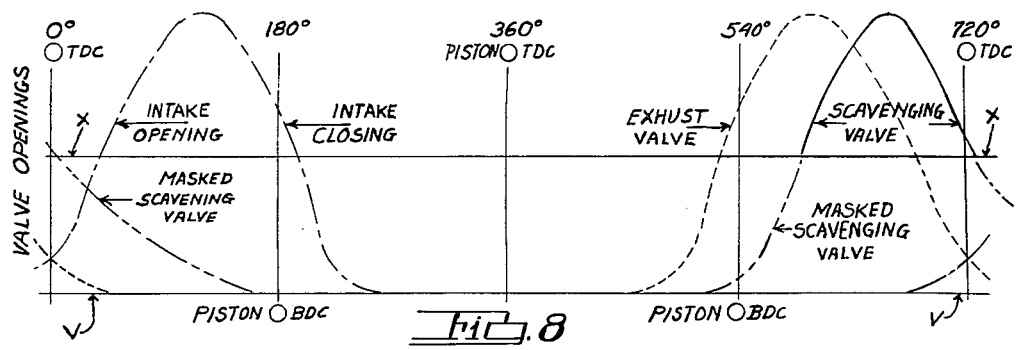
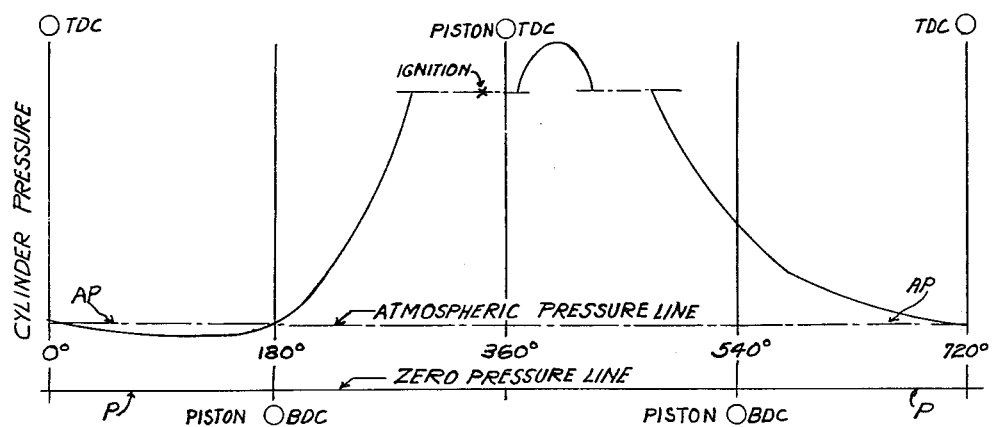
INVENTOR.
JOHN DOLZA
BY
ATTORNEY

United States Patent Office 3,046,961
Patented July 31, 1962

3,046,961
INTERNAL COMBUSTION ENGINES
John Dolza, Fenton, Mich., assignor to Fiat Motor Company (Fiat S.p.A.), Turin, Italy
Filed Sept. 26, 1960, Ser. No. 58,457
2 Claims. (Cl. 123—76)

This invention relates to four-cycle internal combustion engines and more particularly to improved, simple and effective means for scavenging exhaust gases from the cylinders thereof whereby residual exhaust gases in the cylinder are removed at the proper time and replaced by a charge of fresh air and air-fuel mixture, whereby to assure substantially combustion of the air-fuel mixture, thereby resulting in the presence of a minimum of harmful gases and noxious odors in the engine exhaust, and which will improve power output of the engine.

In conventional engines, at idle, near idle and coasting, the exhaust contains large amounts of carbon monoxide and hydro-carbons due to the introduction of rather small amounts of air-fuel mixture in relation to the large amount of residual exhaust gases in the combustion chamber.

In the instant invention combustion at idle, near idle and coasting is improved by replacing with air a major portion or substantially all of the residual exhaust gases within the cylinder after the expansion stroke so that the air-fuel mixture in the combustion chamber at the beginning of the intake stroke is as required for proper combustion; thus, a more complete combustion of the air-fuel mixture will take place when ignited near the end of the compression stroke. When the engine throttle is open beyond idle or near idle or is at wide open throttle, the usual air-fuel mixture at or near stoichiometric value selected by proper carburetor setting produces good combustion substantially free from unburned fuel; therefore, at normal open throttle engine speeds, no serious problem of the presence of harmful gases or noxious odors in the engine exhaust exists.

A primary object of this invention is to provide in a four-cycle spark ignited internal combustion engine an improved method and means for scavenging exhaust gases from the cylinder thereof when the engine is operating at engine idle and near idle throttle, the said method and means functioning responsive to engine throttle setting.

Another object of the invention is to provide in a four-cycle internal combustion engine means for scavenging the residual exhaust gas by flowing air into the cylinder approximately during the last half of the exhaust stroke.

Another object of the invention is to provide in a four-cycle internal combustion engine an exhaust system of adequate size to discharge the bulk of the exhaust gases during the first half of the exhaust stroke, and then to introduce scavenging air under pressure to replace the exhaust gases in the cylinder during the latter portion of the exhaust stroke.

A further object of the invention is to control scavenging air pressure flow by means of a scavenging valve operated from the cam shaft which also opens and closes the conventional intake and exhaust valves, and to provide the scavenging valve opening in relation to the exhaust valve opening in proper timed relationship.

It is also an object of the invention to provide a scavenging valve having one portion for closing a valve in an air port leading from a source of compressed air to the cylinder against internal cylinder pressure, and another portion for opening and closing the said air port subsequently to the opening of said first scavenging valve portion to obtain proper timing of all valve opening and closing by a single cam shaft having thereon two cams for each cylinder; one cam operating the intake and exhaust valves, and the other cam operating the scavenging valve.

Other objects and advantages of the invention will be more fully understood by reference to the following detailed description taken in connection with the accompanying drawings in which:

FIG. 5 is a fragmentary sectional view of the scavenging valve in closed position.

FIG. 6 is a view corresponding to FIG. 5 but showing the scavenging valve, the poppet valve portion of the said valve being open and the sleeve valve portion or mask thereof closing the scavenging port.

FIG. 7 is a view corresponding to FIG. 5 but showing both portions of the scavenging valve in a fully open position.

FIG. 8 is an engine valve operating diagram showing a preferred timing of the intake, exhaust and scavenging valves related to piston location and crankshaft rotation through the four cycles of operation of a four-cycle engine.

FIG. 9 is a cylinder pressure diagram showing the cylinder pressures related to absolute and atmospheric pressures occurring during the four cycles of operation of a four-cycle engine, the said FIG. 9 being disposed directly below FIG. 8 to admit of ready coordination of the cylinder pressures with the engine valve timing.

The particular embodiment of the invention disclosed herein is illustrated in connection with a single cylinder four-cycle engine for the purpose of clarity and simplicity. It is obvious that the invention is equally applicable to multi-cylinder four-cycle engines.

Figure 1:
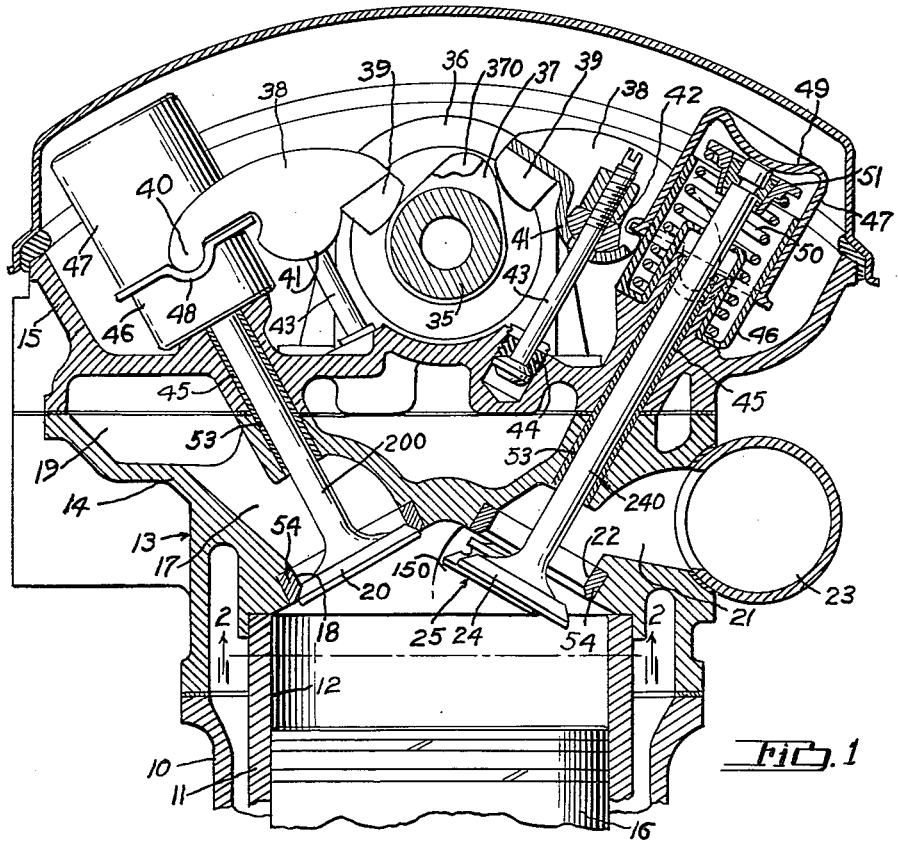
FIG. 1 is a fragmentary vertical sectional view through a single cylinder of a four-cycle engine embodying the invention, showing the intake and exhaust valves.

The four-cycle internal combustion engine is shown in FIG. 1 as having a cylinder block 10 including a cylinder 11 having a cylinder bore 12 therein, and a cylinder head 13 formed by uniting a lower die cast section 14 with an upper die cast section 15. A piston 16 is reciprocatingly mounted in the cylinder bore 12 by the usual crankshaft and connecting rod, not shown.

The cylinder head section 14 is provided with an intake passage 17 having an intake port 18 opening into the cylinder bore 12, and an intake manifold 19 formed in both cylinder head sections 14 and 15. An intake valve 20 controls the opening and closing of the intake port 18. The cylinder head section 14 also has an exhaust passage 21 therein including an exhaust port 22 opening into the cylinder bore 12, and an exhaust manifold 23 formed to receive exhaust gases from the exhaust passage 21. An exhaust valve 24 controls the opening and closing of the exhaust port 22.

Figure 3:
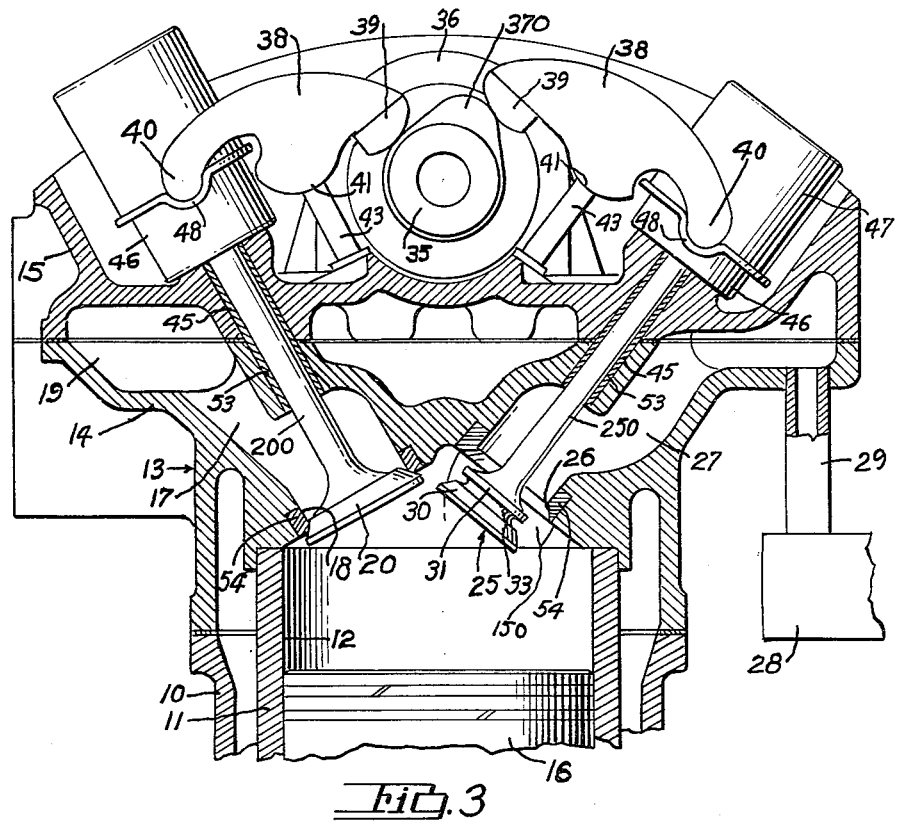
FIG. 3 is a fragmentary vertical sectional view taken on line 3—3 of FIG. 2 showing the intake valve and the scavenging valve.
Figure 4:
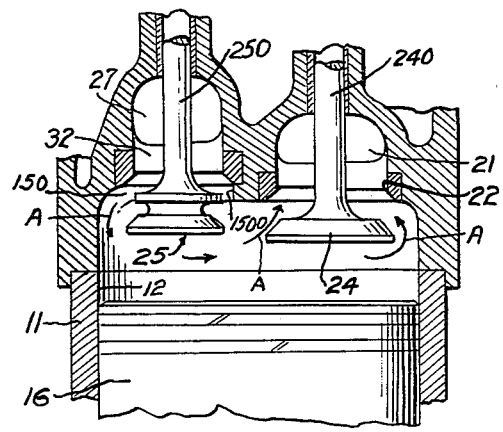
FIG. 4 is a sectional view taken on line 4—4 of FIG. 2 showing the scavenging valve and the exhaust valve.

Referring to FIG. 3, the scavenging valve 25 is shown for opening and closing a scavenging air port 26 opening into the cylindrical bore 12 from a scavenging air passage 27. A compressor 28, shown diagrammatically, is operated by suitable engine mechanism not shown for supplying compressed air to the scavenging air passage 27 through a conduit 29. The scavenging valve 25 and its operation is more clearly shown in FIGS. 5, 6 and 7. The said scavenging valve 25 comprises a poppet valve portion 30 for opening and closing the scavenging air port 26, and has a piston valve portion 31, spaced axially from the poppet portion 30 and slides in the cylindrical inner surface 32 of the scavenging air passage 27. An undercut 33 is provided between the poppet portion 30 and the sleeve portion 31 of the said scavenging valve 25 to facilitate grinding of the poppet valve portion 30. The scavenging valve 25, intake valve 20 and exhaust valve 24 are each provided with valve stems 250, 200 and 240 respectively.

All valves are opened and closed by an overhead cam shaft 35 journaled in bearings 36 and driven by the engine crankshaft in the conventional manner not shown. The valve operating mechanism is shown in detail in FIG. 1 in connection with the exhaust valve 24; the intake valve 20 and scavenging valve 25 being operated by the same type of mechanism but shown in elevation. The cam lobe 37 operates rocker arms 38 for the intake valve 20 and the exhaust valve 24, each rocker arm 38 having a shoe 39 at one end for sliding contact with the cam lobe 37. A rocker arm 38 is described in connection with the valve operating mechanism of the exhaust valve best shown in FIG. 1, and is channel shaped having a bifurcated end portion 40 at one end thereof. The central portion of the rocker arm 38 is provided with an arcuate bearing portion 41 which receives an adjustable bearing 42 threaded on a supporting stem 43 which is secured to the cylinder head 13 by nut 44 permitting rotation of the said stem 43 for adjustment of the bearing 42. The valve stem 240 of the exhaust valve 24 projects upwardly through and beyond valve stem guides 45 formed in the cylinder head sections 14 and 15. An inner sleeve 46 is supported on the cylinder head section 15 around the outwardly projecting portion of the guide 45 for the valve stem 240, and it guides an inverted cup 47 having longitudinal reciprocation over and relative to said sleeve 46. The cup 47 has depressed flanges 48 at its opposite sides in the outer rim thereof. The bifurcated ends 40 of the rocker arm 38 engage the depressed flanges 48 of the said cup 47. The closed end portion 49 of the cup 47 bears against the outer end of the valve stem 240. A compression spring 50, acting between the sleeve or cylinder head section 15 and a spring cap 51 which is keyed to the outer end of the valve stem 240 urges the valve 24 toward its closed position. The rocking motion of the rocker arm 38 produced by the cam lobe 37 causes the cup 47 to slide longitudinally on the sleeve 46 and open the valve 24.

The foregoing description of operating mechanism for the exhaust valve 24 also applies to the operating mechanism for the intake valve 20 and the scavenging valve 25. However, the exhaust valve 24 and the intake valve 20 are operated by a single cam 37, and the scavenger valve 25 is operated by another cam 370; both cams 37 and 370 being formed on the cam shaft 35. These cams 37 and 370 could be combined if so desired.

A suitably shaped cavity 150 is formed in the lower surface of the cylinder head section 14 above the cylinder bore 12 and surrounds the scavening port 26, the said cavity 150 tapering in depth and becoming flush with the lower surface of the cylinder head section 14 adjacent the inner wall thereof on the side of the scavenging port 26 away from the exhaust port 22. The portion 1500 of the said cavity 150 is relatively deep and forms a shield to direct the incoming scavenging air pressure flow away from the exhaust valve 24 to the wall of the cylinder bore 12 where the pressure scavenging air flow is deflected to the top of the piston 16 and thereacross to the opposite wall of the cylinder bore 12 from whence the said pressure scavenging air flow moves upwardly through the exhaust port 22, the said pressure scavenging air flow carrying before it to the exhaust port 22 residual exhaust gases existing in the cylinder bore 12 as the piston 16 travels upwardly on its exhaust stroke to top dead center position.

Figure 2:
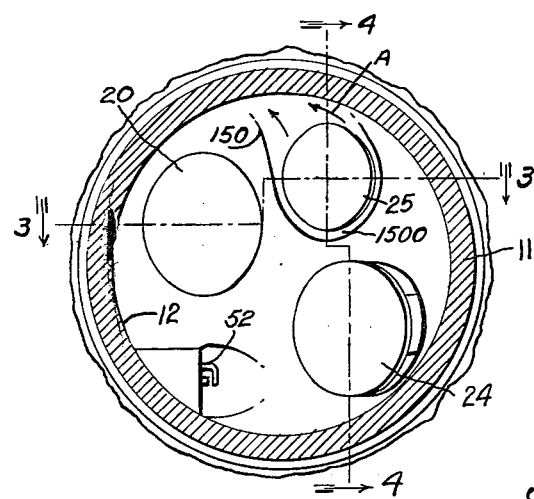
FIG. 2 is a cross sectional view taken on line 2—2 of FIG. 1 showing the relative location of the intake, exhaust and scavenging valves.

Due to the cam shaft being located above the longitudinal axis of the cylinder, and because of the use of rocker arms to move the valves, the valves reciprocate on inclined axes which converge toward the cylinder. The usual spark plug 52 employed to ignite the air-fuel mixture in the combustion chamber is shown in FIG. 2.

The cylinder head is preferably made of aluminum in two sections which are designed in such a manner that they can be die cast. Sleeve inserts 53 may be provided for the valve stem guides and inserts 54 for the valve seats. These inserts 53 and 54 may be cast in the aluminum sections and are of a metal harder than aluminum.

Referring now to the engine valve operating diagram shown in FIG. 8, the abscissa of the diagram indicates the intake, compression, expansion and exhaust strokes of the piston of the four-cycle engine occurring sequentially during 720 degrees of crankshaft rotation. The top dead center, TDC, of the engine piston is at zero, 360 and 720 degrees of crankshaft rotation, and bottom dead center, BDC, of the engine piston is at 180 and 540 degrees of crankshaft rotation, as indicated at said points of crankshaft rotation. The ordinate of the diagram indicates the valve openings. The opening and closing of the engine intake valve is shown by dot and dash lines, the opening and closing of the engine exhaust valve is shown by dotted lines, the opening and closing of the scavenging valve is shown by full lines, and the opening and closing of the poppet valve portion of the scavenging valve being shown in dash and two dot lines, all related to the valve closed base line V—V.

Directly below FIG. 8 and vertically aligned therewith is FIG. 9 showing a cylinder pressure diagram in which the abscissa of the diagram indicates the engine piston stroke and the crankshaft rotation as in FIG. 8. The ordinate in FIG. 9 shows the absolute cylinder pressure during the four strokes represented by a full line curve related to the zero absolute pressure base line P—P, the atmospheric pressure being represented by a dot and dash line AP—AP paralleling the said base line P—P.

In a conventional engine, at idle or near idle throttle with the engine coasting (i.e. when the throttle is practically closed and the engine is being driven by the connected load at a greater r.p.m. than it would run under idle throttle, and the intake system of the engine is below atmospheric pressure) the engine exhausts large amounts of carbon monoxide and hydrocarbons. This phenomenon is due to the introduction of rather small fresh charges of air-fuel mixture in relation to the large amount of residual exhaust in the cylinder. It is well known that the foregoing condition of conventional engine operation retards combustion and requires that air-fuel mixture at idle or near idle throttle with the engine coasting delivered by the carburetor be rich, or stated in another manner, that the amount of fuel mixed by the carburetor with air under such engine operation be greatly in excess of the stoichiometric value, and is unsatisfactory for wide-open throttle or at high speed engine operation.

In the instant invention, at idle, near idle and coasting, combustion is greatly improved by replacing part of the residual exhaust normally remaining in the cylinder by the introduction of scavenging air under pressure therein during the latter part of the exhaust stroke and the beginning of the intake stroke of the piston so that residual gases in the combustion chamber at the beginning of the intake stroke are substantially replaced with air whereby a more complete combustion of the incoming air-fuel mixture than otherwise will take place when the air-fuel mix is ignited substantially at the end of the compression stroke.

The valve operation indicated in FIG. 8, occurring during the four cycles of a four-cycle engine embodying the invention, is for illustrative purposes only, and pertains to a specific engine design, it being understood that the precise points of valve openings and closings may be varied as required by characteristics of other engine designs, such as piston stroke, piston bore, valve sizes, length of the exhaust pipe, exhaust resistance to flow, and the like.

Referring to FIG. 8, it will be seen that at the beginning of the intake stroke, the piston valve portion 31 of scavenging valve 25 has closed the intake port 18 but the poppet valve portion 30 remains open during the first part of the intake stroke. This is to permit the operation of the scavenging valve from the same cam shaft which operates the intake valve 20 and exhaust valve 24. It will also be noted that the poppet valve portion 30 of the scavenging valve 25 begins to open at the end of the expansion stroke but the sleeve valve portion thereof does not open the scavenging air port 26 until after the exhaust valve 24 has been opened, and the scavenging air port 26 remains open throughout the remaining portion of the exhaust stroke, as indicated by the horizontal full line X—X. It will be noted that there is a slight overlapping of intake and exhaust valve openings at the end of the exhaust stroke and the beginning of the intake stroke.

Although but a single embodiment of the invention has been disclosed and described herein, it is obvious that many changes may be made in the size, shape, arrangement and detail of the several elements of the invention, all without departing from the spirit and scope of the invention as defined by the appended claims.

I claim:

1. In a four-cycle internal combustion engine, a cylinder, a cylinder head forming a combustion chamber with said cylinder, a piston reciprocating in said cylinder, intake and exhaust ports in said head leading to and from said combustion chamber, intake and exhaust valves for opening and closing said ports, a scavenging air passage in said head, means supplying air above atmospheric pressure to said scavenging air passage, a scavenging valve in said head having a poppet valve portion for opening and closing said scavenging air port and passage, and a piston valve portion for opening and closing said scavenging air passage while said poppet valve portion is in its open position.

2. In a four-cycle internal combustion engine, a cylinder including a head forming a combustion chamber with said cylinder, a piston reciprocable in said cylinder, intake and exhaust ports leading to and from said combustion chamber, a scavenging port leading to said combustion chamber adjacent said exhaust port, a source of scavenging air under pressure greater than cylinder pressures communicating with said scavenging port, intake, exhaust and scavenging valves opening and closing said ports, the said cylinder head having a cavity formed therein surrounding said scavenging port having a tapered portion curvedly sloping toward the wall of the cylinder bore adjacent said scavenging valve and away from said exhaust valve, said cavity having a wall portion between said scavenging port and said exhaust port forming a shield for directing incoming scavenging air flow toward said tapered portion and the said wall of the cylinder bore adjacent said scavenging valve whereby said scavenging air flow is deflected across the top of the piston to the opposite side of the cylinder bore and then through said exhaust port.

References Cited in the file of this patent

UNITED STATES PATENTS

| | | |
|---|---|---|
| 564,576 | Altham | July 21, 1896 |
| 1,471,955 | Grieve | Oct. 23, 1923 |
| 2,240,088 | Birkigt | Apr. 29, 1941 |
| 2,940,432 | Hijszeler | June 14, 1960 |

FOREIGN PATENTS

| | | |
|---|---|---|
| 402,283 | France | Aug. 9, 1909 |
| 85,857 | Austria | Dec. 15, 1920 |
| 681,827 | France | Feb. 4, 1930 |